May 12, 1925.
J. R. HENDERSON
AUTOMOBILE BATTERY INDICATOR
Filed Jan. 10, 1925
1,537,823
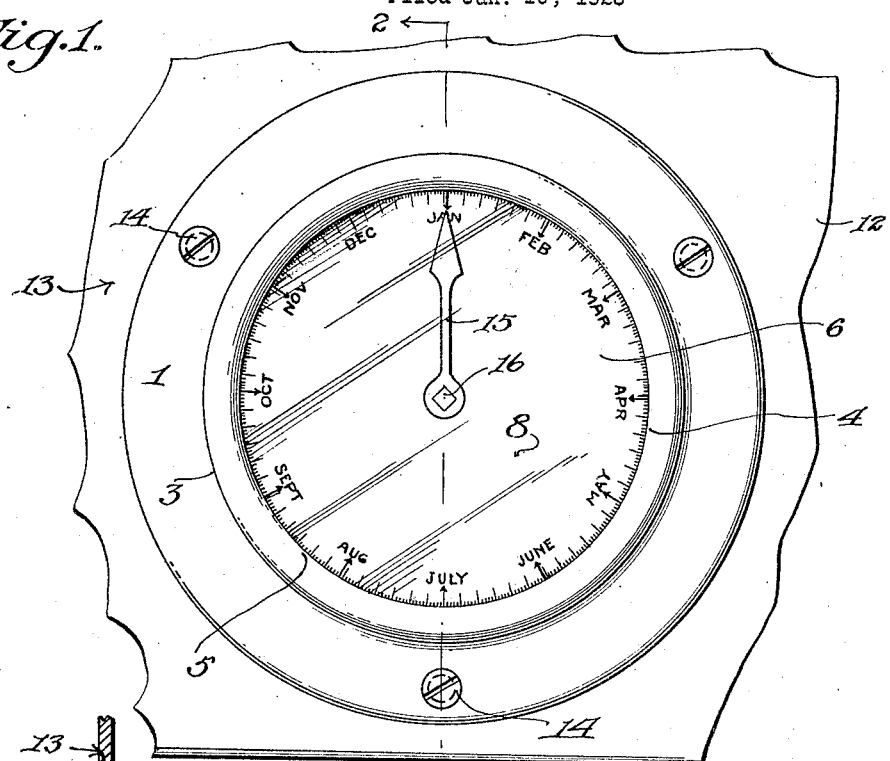
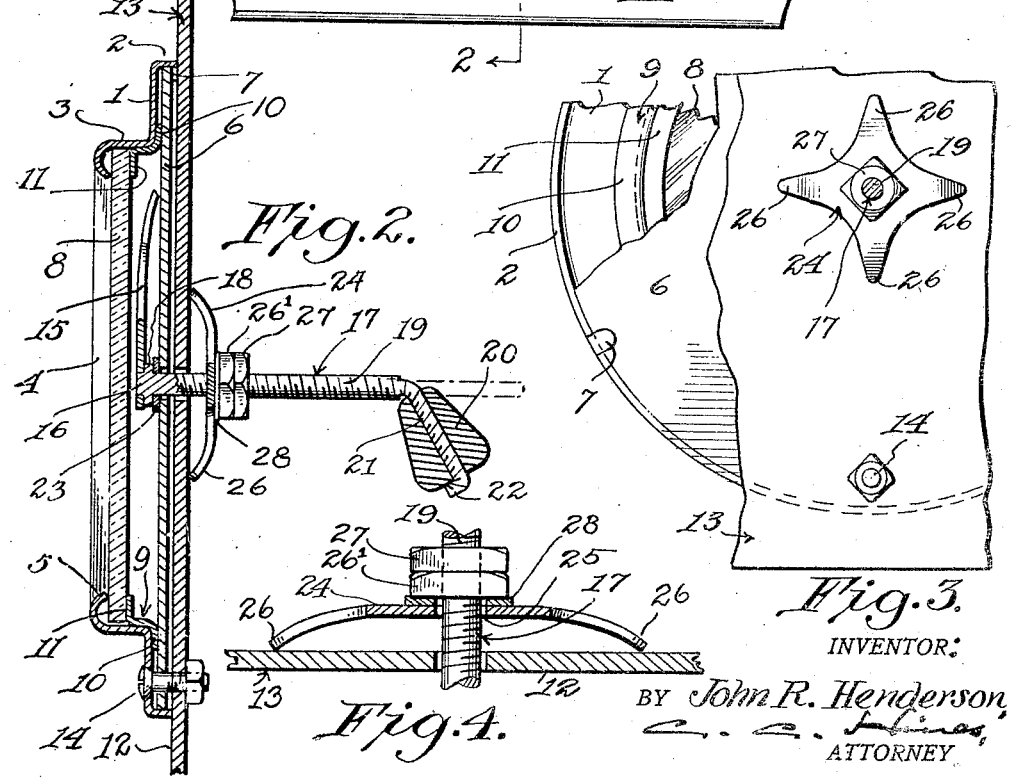
INVENTOR:
BY John R. Henderson,
ATTORNEY Patented May 12, 1925.

1,537,823

UNITED STATES PATENT OFFICE.

JOHN R. HENDERSON, OF HAMLET, NORTH CAROLINA.

AUTOMOBILE BATTERY INDICATOR.

Application filed January 10, 1925. Serial No. 1,619.

*To all whom it may concern:*

Be it known that I, JOHN R. HENDERSON, a citizen of the United States, residing at Hamlet, in the county of Richmond and State of North Carolina, have invented new and useful Improvements in Automobile Battery Indicators, of which the following is a specification.

This invention relates to improvements in indicators, and particularly to an indicator for use upon the dashboard or instrument board of an automobile whereby the owner or driver of the automobile may be able to indicate and keep before him for observation and ready reference an indication of the date on which his battery was last replenished with water, or a future date on which the battery should be replenished with water, so that measures may be taken to ensure the replenishment of the battery with water at desired and regular periods in order to maintain the battery in good working condition.

One object of the invention is to provide a simple, reliable and inexpensive type of indicator which may be applied to the dashboard or instrument board of any make of automobile in a ready and convenient manner.

Another object of the invention is to provide an indicator which embodies means for easy adjustment of an indicating hand or pointer and the maintenance of the hand or pointer in adjusted position against any tendency to its displacement under jolts, jars or vibrations of the vehicle.

Still another object of the invention is to provide an indicator which consists of a comparatively small number of parts capable of being easily and quickly assembled for use and disassembled for cleaning, repairs or other purposes.

The invention consists of the features of construction, combination and arrangement of parts, hereinafter fully described and claimed, reference being had to the accompanying drawing, in which:—

Figure 1 is a face view of the indicator showing the same applied to an instrument board.

Figure 2 is a section on the line 2—2 of Figure 1.

Figure 3 is a fragmentary rear elevation of the device applied as shown in Figures 1 and 2, with parts broken away to better show the construction.

Figure 4 is a detail section on an enlarged scale showing the shaft, the spring pressure member, and the adjusting and locking means therefor.

In the practical embodiment of my invention I provide an indicator comprising a casing which may be of circular outline, as shown, said casing having a rear portion 1 of major diameter and provided with a rearwardly extending flange 2, and having a front portion 3 of smaller diameter and formed to provide an observation opening 4, the forward edge of the part 3 being inturned to provide a flange 5 defining the margins of said observation opening. The rear portion of the casing defined by the flange 2 is normally open and adapted to be closed by a disk 6, of metal or other suitable material surrounded by the flange 2 and which may be secured in position by integral tongues 7 formed upon the flange 2 and bent inwardly to engage the rear surface of the disk 6. The front of the casing is closed by a panel 8 of glass or other suitable transparent material which is held in position by a clamping ring or annular clamping member 9 having a flanged portion 10 disposed between the casing body 1 and disk 6 and clamped in position therebetween, and having a flanged portion 11 bearing against the panel 8 and clamping the same against the flange 5, whereby the above-described relatively stationary parts of the device are held assembled and in relatively fixed position.

The flanged rear surface 2 of the casing 1 is adapted to be arranged to bear against the obverse face 12 of the dashboard or instrument board 13 of an automobile and is pierced with openings at suitable points for the passage of bolts 14 which pass through openings in the instrument board and fasten the casing to the instrument board. The indicator is thus positioned upon the instrument board so as to be within view of the driver or an occupant of the front seat of the vehicle for ready and convenient observation or inspection. The disk 6 is provided upon its front face with a dial surface, showing through the transparent panel 9. This dial surface is provided with suitable indicia to indicate the time periods or dates, and, for example, may embody main divisions representing and appropriately designated by the months of the year, with each month division divided by appropriate scale divisions into week and day periods or other appropriate periods. A hand or pointer 15 is provided within the casing to traverse the dial face and for adjustment into registry with any of the divisions thereof. This hand or pointer is fitted upon the reduced forward end 16 of an operating shaft 17 having a shouldered front portion 18, which shaft is designed to pass through an opening in the disk 6 and through a registering opening in the instrument board 13 beyond the obverse face 19 of said instrument board. The shaft is provided with a threaded surface 19 which may extend substantially throughout its length, and the outer end of said shaft carries a knob or other suitable manipulating handle or finger piece 20 whereby it may be revolved to adjust the pointer 15. This knob or finger piece 20 is angularly slotted and may also be threaded to engage a portion 21 of the shaft having two flattened sides, making it of angular form, adapting the knob or finger piece to be slidably fitted thereon and locked against rotation by the flattened faces thereof. This knob or finger piece may be held from outward displacement by engagement with the threads of the portion 21, or by bending the extremity 22 of said portion 21 at an angle to form a stop member. The operating end of the shaft is arranged in the space between the vehicle hood and instrument board and may be reached by inserting the hand into this space below the edge of the instrument board. The portion 21 of the shaft carrying the knob 22 may be bent, as shown in Figure 2, from the normal dotted line position at an angle to the plane of the shaft 17, if desired, so as to dispose it in more convenient position for engagement and manipulation.

It will be understood that the user may adjust the hand 15 to a proper position on the dial to indicate the date on which the battery was last replenished with water or the date on which the battery should again be replenished with water, and may thus have before him at all times a ready and convenient record for reference, so that, according to the period of the year, he may set the indicator each time the battery is replenished with water to indicate either that date or the future date on which the battery should again be replenished with water, the indicator thus serving as a reminder in constant view while the vehicle is in use of the time periods when the battery has been replenished or is required to be replenished, according to the time periods determined, so that the dates will not be overlooked or forgotten. If the operator, therefore, gives proper care and attention to the indicator, he will be guided so that the replenishment of the battery with water will not be forgotten, the instrument thus serving as a material aid to the operator in keeping the battery replenished with water and in proper service condition.

Disposed between the shoulder 18 and the dial face of the disk 6 is a washer or friction element 23 of fibre or other suitable material, and disposed upon the shaft is a concavo-convex or bowed spring pressure member 24 for cooperation with said friction element 23. The member 24 comprises a central disk or body portion having an axial opening 25 for passage of the shaft, and by which it is slidably fitted thereon, from which body portion projects an annular series of a desired number of spring fingers 26. When the device is applied in position, the points or ends of these spring fingers bear against the reverse face of the instrument board 13 and by their arrangement these fingers serve to maintain the shaft 19 in proper position or alinement and to prevent any tilting motion of the shaft or pointer in the adjustment of said shaft or travel of the vehicle. The pressure device is adapted to be adjusted by means of an adjusting nut 26' engaging the threaded surface of the shaft, and a jamb nut 27 may be provided for locking this adjusting nut in position. By means of the adjusting nut the pressure member may be adjusted to regulate the pressure of its spring fingers on the instrument board, so as to ensure a steady and reliable support of the shaft. By this adjusting action also the shouldered portion 18 of the shaft may be drawn with a desired force against the friction washer 23 and the latter pressed with the desired force against the disk 6, thereby instituting any required and desired frictional pressure to stably support the hand or pointer 15 to adapt it to rotate in a fixed plane and to hold it secured in any position of adjustment against any possibility of displacement from jolts, jars or vibrations in the running of the vehicle. By variation of the spring pressure of the bowed spring member, it will be understood that any degree of spring pressure holding action may be established, and that by adjustment of the nut 26' at any time any possible looseness due to wear may be taken up to maintain the established spring pressure action constant and to ensure the retention of the hand or pointer against any possibility of movement out of its adjusted position until it is positively actuated by manipulation of the shaft through the knob or finger piece. If desired, a friction washer or member 28, of fibre or other suitable material, may be disposed between the member 24 and nut 26', to obviate any possible liability of slippage and to ensure the holding of the spring pressure member against casual rotation from jolts, jars or vibrations of the vehicle.

The mode of use and operation of the device will be readily understood from the foregoing description, taken in connection with the drawing, and it will be seen that the invention provides a device for the stated purpose which may be applied to the instrument board of any make of automobile by simply punching or drilling the instrument board to provide holes for the reception of the fastening members 14 and passage of the shaft 17, and that when the device is applied in position the operating knob 20 may be reached by the hand of the operator by inserting the hand upwardly beneath the lower edge of the instrument board, so that the hand or pointer 15 may be adjusted whenever required. An important feature of my invention resides in the fact that no auxiliary fastenings are required for holding the shaft in applied position, the friction elements serving both to support the shaft and to maintain the hand or pointer in working position for accurate travel around the face of the dial. As the construction of the device is simple, it may be manufactured and sold at a comparatively low cost, and may also be assembled and applied for use and disassembled for cleaning or repairs in a ready and convenient manner and by any one having ordinary knowledge of the use of tools.

Having thus fully described my invention, I claim:—

1. In an indicator, a casing adapted to be applied to the obverse face of a wall, a dial in said casing, a pointer in the casing for cooperation with the dial, a shaft carrying the pointer and adapted to be extended through the wall beyond the reverse face thereof, said shaft being continuously threaded toward its rear end and having its rear portion flattened at two diametrical sides, spring pressure means on said shaft engaging the reverse face of the wall, and an operating knob fitted on the threaded and flattened portion of the shaft and held from rotation by the flattened sides thereof, said threaded and flattened portion of the shaft having its extremity bent at an angle thereto for retaining said knob in position thereon.

2. In an indicator, a casing adapted to be applied to the obverse face of a wall, a dial in said casing, a pointer in the casing for cooperation with the dial, a shaft carrying the pointer and adapted to be extended through the wall beyond the reverse face thereof, said shaft being continuously threaded toward its rear end and having its rear portion flattened at two diametrical sides, spring pressure means on the shaft engaging the reverse face of said wall, threaded adjusting members engaging the shaft for regulating the pressure of said spring pressure means, and an operating knob fitted on the threaded and flattened portion of the shaft, said portion being bent at an angle to the plane of the shaft and having its extremity bent at an angle to its plane for retaining said knob in position thereon.

In testimony whereof I affix my signature.

JOHN R. HENDERSON.